United States Patent Office  3,606,361
Patented Sept. 20, 1971

3,606,361
FLAT GASKET FOR THE CYLINDER HEAD OF COMBUSTION ENGINES AND PROCESS FOR MAKING SAME
Ulrich Pohl, 40 Lerchenauerstrasse, 8 Munich 13, Germany; Otto Stulle, 214 Parksiedlung, 8042 Oberschleissheim, Germany; Lambert Riehl, 52 Augsburgerstrasse, 7910 Neu-Ulm, Germany; and Walter Stadelmann, 1 Zimtweg, 7 Stuttgart-Heumaden, Germany.
Filed Mar. 14, 1969, Ser. No. 807,220
Claims priority, application Germany, Mar. 15, 1968, P 16 75 356.3; May 14, 1968, B 75,755; Nov. 29, 1968, P 18 11 789.0
Int. Cl. F16j 15/06
U.S. Cl. 277—235B        10 Claims

ABSTRACT OF THE DISCLOSURE

A flat cylinder head gasket includes a sealing ring, formed as a split ring, around at least one opening, with a metal shield surrounding the split ring and, when inserted in place, causing the abutting ends of the split ring to be tightly joined together. The sealing ring is formed by stretching and winding a profiled wire on a helical form and cutting the helix in a longitudinal direction, and the rings are radically compressed by the inward deformation of the surrounding metal shield.

---

The invention refers to a flat gasket, especially a gasket for the cylinder head of combustion engines, with a reinforcing and/or sealing rings and their connection with a previously described flat gasket ring.

A flat gasket of the previously described construction has been known through German Pat. 1,017,416, where the metallic reinforcing and/or sealing ring is produced by way of mechanical machining, for example, through a cut off from pipe and connection with the metal frame through interstratification and/or soldering in. Through the mechanical machining of the reinforcing and/or sealing rings, the price of such a flat gasket as compared to a flat gasket without reinforcing and/or sealing rings has been increased so considerably that the use of such reinforcing and/or sealing rings can be justified economically only in the case of expensive special designs of machines and other sealing devices, although the sealing effect and the life of flat gaskets will be considerably improved through such reinforcing and/or sealing rings.

It is an object of the invention to shape the initially mentioned flat gasket in its construction in such a manner, that it can be produced in a particularly economical manner. This task is solved by the invention through the fact that the reinforcing and/or sealing ring is split and that it is closed at its butt joint at least approximately flush. Through this construction of the gasket it is possible to produce the metallic reinforcing and/or sealing ring from a streamlined wire section or from a profiled rod with a length predetermined by the unwinding of the reinforcing and/or sealing ring, which can be accomplished by the particularly economical finishing processes through section rolling and drawing as well as through impact extrusion.

A further characteristic of the invention consists in this, that at least one of the faces of the reinforcing and/or sealing ring has, in a manner known per se, at least one sharp edged annular profile as a sealing edge. As a result of that, a sealing effect will be achieved. absorbing the high combustion pressures in the combustion chamber in the case of cylinder head gaskets for combustion engines, without the pressure of the constructional elements enclosing the gasket reaching impermissibly high values. Through the fact that the sharp edged annular profile impresses itself into at least one of the adjoining constructional elements, such as particularly into the sealing surface of the cylinder head of a combustion engine consisting of light metal, the sealing ring additionally is fixed in such a manner that the seal of its butt joint will be guaranteed with a particularly high degree of reliableness.

For the connection of the reinforcing and/or sealing ring with the flat gasket, provision is made that the outside periphery of the reinforcing and/or sealing ring may have a projecting or recessing profile deviating from the cylindrical, such as an angular, rectangular, trapezoid groove, or a concavely tapered groove already known for this purpose, or a correspondingly shaped annular elevation.

Besides the possibility of producing the reinforcing and/or sealing ring from steel, the invention provides that the reinforcing and/or sealing ring consist of streamlined wire made of a non-ferrous metal allow with a specific pressure resistance similar to steel, such as German silver, nickeline, cast bronze or similar materials. The use of such nonferrous metals has the advantage that the streamlined wire can be produced in particularly small cross sectional sizes with great accuracy as to gauge, above all at the sealing edge of an irregular annular profile.

In order to guarantee reliableness in regard to a mutual radial shifting of the abutting surfaces of the reinforcing and/or sealing ring in the case of gaskets under particularly high load, the invention provides that the butt joint may be formed either along an arcuate line or an angular line transversely to a radial plane.

In a preferred process for the production of reinforcing and/or sealing rings for their connection with the flat gasket according to the design of the invention described previously, the invention provides that streamlined wire with the cross sectional shape of the reinforcing and/or sealing rings be wound in several turns on a spindle having the inside diameter of the reinforcing and/or sealing ring as its outside diameter, so that the turns of the streamlined wire will be separated by cutting into split rings, so that one split ring each is inserted into an opening of the flat gasket and is attached in the latter through deformation of the metal shield of the flat gasket, in such a manner that the ring is pre-tensioned radially inwardly so that its butt joint surfaces are pressed against each other through this pre-tension so that the butt joint is closed. This method of operation makes possible a continuous and, therefore, particularly economical production process for a large part of the processing steps.

In the development of this process, provision has been made that a spindle is used with helical peripheral grooves arranged to the cross sectional shape of the streamlined wire and with a longitudinal groove which is at least approximately longitudinal and adapted to the width of the cutting tool. In order to keep the pre-tension of the streamlined wire at least approximately constant during the winding process, the invention provides that the streamlined wire during its winding onto the spindle and during the bending process occurring in this case is at the same time stretched beyond the limit of its elasticity. For this purpose it will be advantageous for a stretching roller to precede the spindle, which roller will at least be partially looped by the streamlined wire during the winding process and from which the streamlined wire will unwind at a lesser speed than it is wound up onto the spindle.

In order to make possible a largely mechanized method of operation in the case of the connection of the reinforcing and/or sealing ring with the flat gasket, a further characteristic of the invention consists in, that first preformed in an L-shape in its cross section, being held there with a radially inherent stress and introduced together with the metal ring into an opening of the flat gasket, and that after securing the position of the sealing ring, in relation to the flat gasket, the metal shield is formed at least approximately in relation to its final U-shaped cross sectional form, whereby the bridge of the U-cross sectional form engages with the profiling of the outside peripheral surface of the sealing ring in a positively locking manner.

In the drawing the invention has been shown on the basis of an embodiment by way of example as well as the illustration of the various steps in the process.

Figure 1:
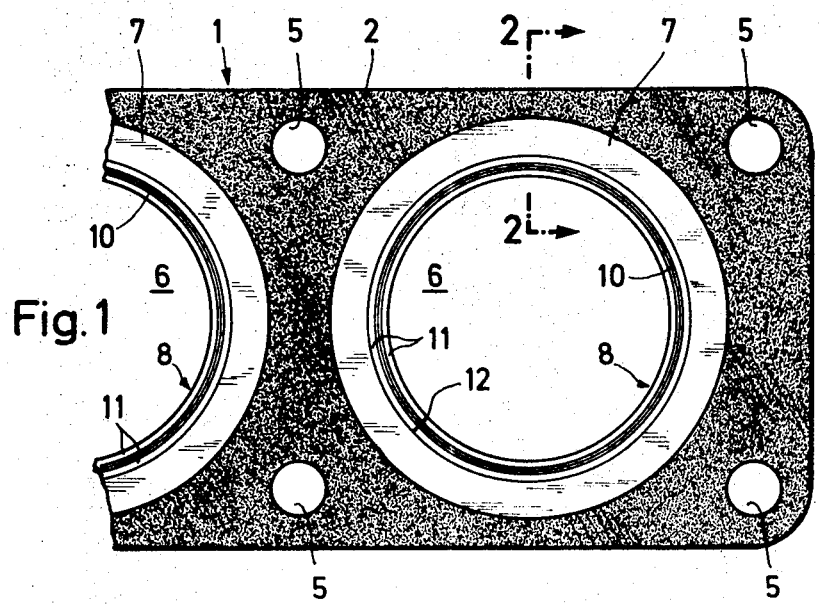
FIG. 1 shows a part of a gasket for a cylinder head for combustion engines in plan view.

A gasket 1 for the cylinder head of combustion engines consists, in the main, (FIGS. 1 and 2) of a plate 2 made of a soft composition, preferably equipped with reinforcing inserts, which plate has the shape and the dimensions of the separating surface between the cylinder block 3 and the cylinder head which has also been provided with openings 5 and 6. The openings 6 for the cylinder bores 6' are protected against the hot combustion gases acting in the cylinder bores 6' by a metal shield 7 consisting of sheet-metal and also by a metallic reinforcing and/or sealing ring 8, called simply a sealing ring in the following description. The thin metal shield 7 is flanged onto the plate 2 by press forming and, at the same time, the sealing ring 8, with its outside enveloping surface 9 shaped like a concave tapered groove, is connected positively by interstratification with the plate 2 made of a soft substance. The sealing ring 8 has on its two faces a sharp edged annular profile 10 which, in the inserted condition, is pressed into the metal of the cylinder block 3 and the cylinder head 4. The shape of this annular profile 10, at the same time, is harmonized in such a way, with the pre-tension of the cylinder head screws, that the flat annular surfaces 11 of the sealing ring 8, arranged on both sides of the annular profile 10, do not abut against each other. In this manner the sealing effect of the seal 1 of the cylinder head will be assured in the area of the plate 2 made of a soft substance for the openings arranged there for the cooling water and lubricating oil.

Figure 2:
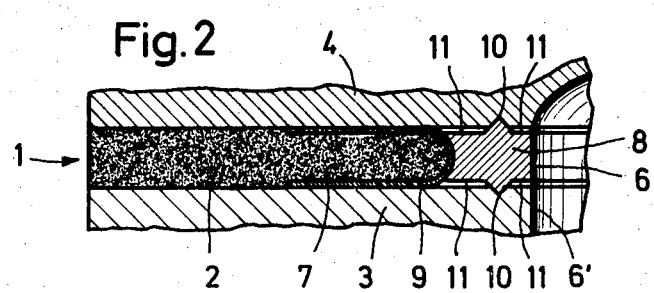
FIG. 2 shows a partial section through a gasket of the cylinder head according to FIG. 1 along the line 2—2 in its inserted condition.

The metallic sealing ring 8, which as described above has a relatively complicated profile, is split and formed with a butt joint 12 (FIG. 1). It consists of an originally straight profiled rod produced by the extrusion molding process or by cutting to length of a drawn streamlined wire, the length of said rod being determined through bending or winding, prior to cutting to length of the streamlined wire into a split ring. The abutting surfaces at the butt joint 12 of the sealing ring 8 are finished by sawing or grinding, especially as a result of cutting off into lengths of the streamlined wire, so that a tight butt joint 12 will be achieved. The tightness of the butt joint 12 will be favored moreover through the fact that the sealing ring 8 has a pressure pre-tension directed radially inwardly as a result of the interstratification into the metal shield 7, which pre-tension will press the abutting surfaces at the butt joint 12 against each other with a considerable force. Soldering or welding together of the butt joints in the area of the joint 12 is not necessary in that case. The immediate proximity of a screw opening 5 assures a particularly high degree of surface pressure for the positional insurance of the sealing ring 8 in the assembled state at the butt joint 12.

Figure 3:
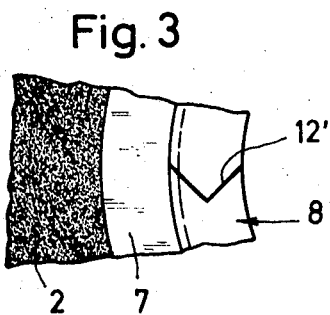
FIG. 3 is a partial plan view of a flat gasket with an angular shaped butt joint.
Figure 4:
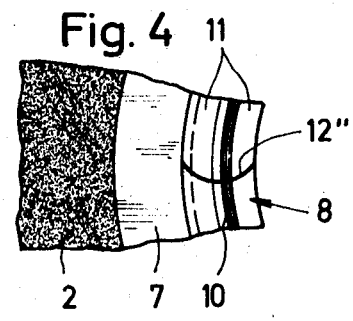
FIG. 4 is a partial plan view of a flat gasket with an arcuate butt joint.

The sealing ring in FIG. 1 has a straight line, radially extending butt joint 12. In contrast to this, FIG. 3 shows a sealing ring 8 (without the edged annular profile 10) with an angularly shaped butt joint 12' and in FIG. 4 a sealing ring 8 is shown with an arcuate butt joint 12''. With such joints as 12' and 12'', the two engaging abutting surfaces of the joint will be fixed in relation to one another positively locking in a radial direction in the clamped position of the ring 8. A mutual radial shifting of the abutting surfaces in these cases is not possible. The angled or curved surfaces of the butt joints 12' and 12'' can be produced, for example, through profile grinding.

Figure 5:
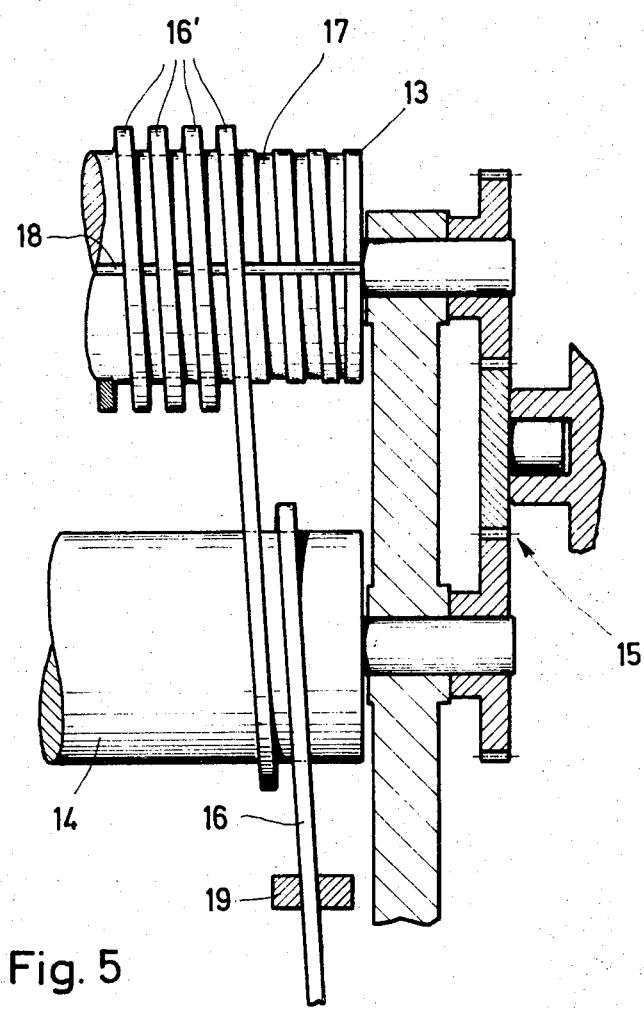
FIG. 5 is a schematic view of a portion of a device for the production of sealing rings for flat gaskets and FIGS. 6–9 are several steps in the process for connecting the sealing rings with the gasket of a cylinder head.

In FIG. 5, a spindle 13 and a stretching roller 14 are mounted at a distance from one another and are driven via a driving mechanism 15 in such a way, that the spindle 13 has a slightly higher peripheral speed than the stretching roller 14. The spindle 13 is provided with peripheral grooves 17 arranged in the form of a screw and adapted to the cross sectional shape of a streamlined wire 16 used as the starting material for the sealing rings and with longitudinal groove 18 extending across the width of the streamlined wire 16 and adapted to the width of a cutting tool such as a circular saw or a cutting grinding disk, not shown, and provided for the cutting of the streamlined wire 16 wound on the spindle 13. The streamlined wire 16, in the case of the driving of the spindle 13 and of the stretching roller 14 through a guide piece 19, moved with a thrust corresponding to the height of the peripheral groove 17 on the spindle 13, in parallel to the spindle 13 and the roller 14, runs first of all onto the stretching roller 14, envelops the latter and then runs into the peripheral grooves 17 of the spindle 13, so that a screw-shaped helix 16' of streamlined wire will be formed. Upon running onto the stretching roller 14, the streamlined wire 16 has a pretension, so that through its envelopment of the stretching roller 14 and of the differing peripheral speeds of the stretching roller 14 and spindle 13, the stretch of the streamlined wire 16 will take place between the unwinding on the spindle 13 or in its peripheral grooves 17. This elongation is selected in such a way, that it will more or less slightly surpass the elasticity limit of the streamlined wire 16 as a result of which an even pre-tension will be assured in the helix 16' or the streamlined wire 16 wound onto the spindle 13. In this case the stretching process will occur at that spot where the streamlined wire 16 already experiences a shifting in the structure through the bending process, namely at the spot where it enters the peripheral grooves 17 at the spindle 13. As soon as the peripheral grooves 17 at the spindle 13 have been filled almost completely with streamlined wire 16, the winding process is stopped and the helix 16' of the streamlined wire 16 is cut through along the longitudinal groove 18, as a result of which a large number of split sealing rings are produced, which are removed from the spindle 13 and inserted in a flat gasket. For the next winding up process, the free end of the streamlined wire 16 is attached to the beginning of the peripheral grooves 17 of the spindle 13, whereupon the next winding process can take place.

Figure 6:
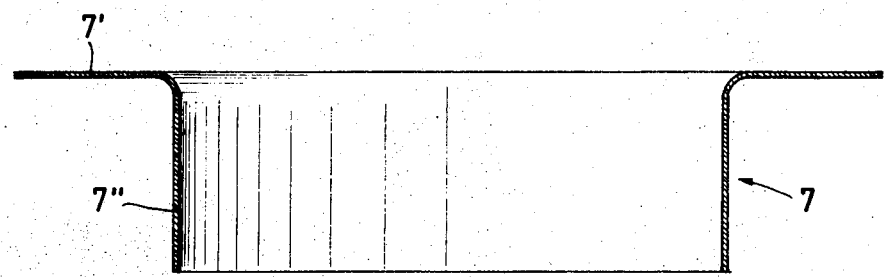
Figure 7:
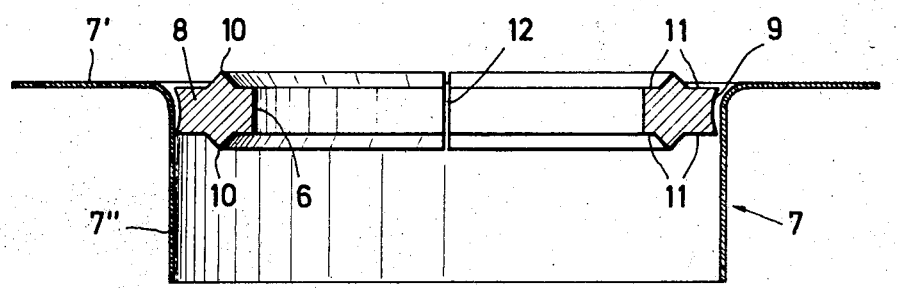
Figure 8:
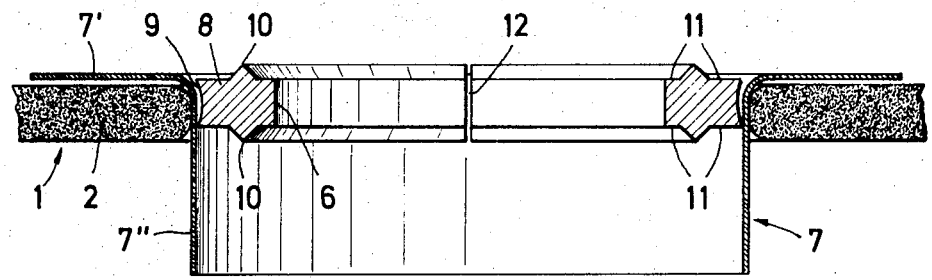
Figure 9:
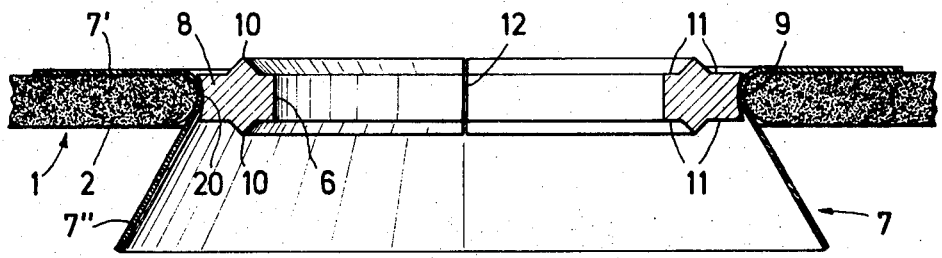

FIG. 6 shows a metal shield 7, prefabricated in L-shaped cross section, with a radial flange 7' and a cylindrical part 7''. As shown in FIG. 7, first of all a sealing ring 8 is introduced in this metal shield 7, which ring is fixed in the cylinder part 7'' because of its radial pre-tension. Metal shield 7 and sealing ring 8 are then introduced together, as shown in FIG. 8, into the opening of a gasket 1 of a cylinder head, whereby the radial flange 7' of the metal shield 7 will rest on the upper side of the gasket 1 whose cylindrical part 7'' causes a rough centering of the metal shield 7 and of the sealing ring 8 in the gasket 1 of the cylinder head. At the same time, the butt joint 12 of the sealing ring 8 still shows a slightly open gap. For a precise fixation of the position of the sealing ring 8 in the gasket 1 of the cylinder head, a centering process by means of a centering tool (not shown) takes place, and immediately afterwards, or even simultaneously, the cylindrical part 7″ of the metal shield 7 is deformed, in such a way that, as shown in FIG. 9, it is brought at least approximately into its final U-shaped cross sectional form. The bridge 20 of the U-shaped cross sectional form of the metal shield 7 will be bent out toward the sealing ring 8 as a result of a cone-shaped course of the original cylindrical part 7″ of the metal shield 7, so that the bridge 20 will engage positively locking into the concave tapered groove-shaped outside peripheral surface 9 of the sealing ring 8 so that a temporary attachment of the sealing ring 8 will be accomplished. The now cone-shaped part 7″ of the metal shield 7 will now fit against the underside of the gasket 1 of the cylinder head in the area of the opening, as a result of which the metal shield 7 together with sealing ring 8 is held in gasket 1 of the cylinder head. During the final pressing of the complete cylinder head gasket, the metal shield 7 will then be brought into its final U-shaped cross sectional form and simultaneously the sealing ring 8 will be prestressed radially inwardly in such a way, that its butt joint 12, 12′ or 12″ closes completely and tightly.

We claim:

1. A flat cylinder head gasket comprising a planar section of comparatively soft material having at least one opening therein, a deformable metal shield having a generally U-shaped cross-section surrounding said opening, and a split metal reinforcing ring compressed within said shield, the ends of said split reinforcing ring abutting each other without overlapping in a butt joint extending continuously over the whole cross-sectional area of said ring.

2. The invention defined in claim 1, wherein at least one of the surfaces of said reinforcing ring includes an annular projecting ridge for sealing engagement.

3. The invention defined in claim 1, wherein the external peripheral surface of the reinforcing ring is centrally recessed in transverse cross-section.

4. The invention defined in claim 1, wherein said reinforcing ring comprises a non-ferrous drawn metal wire having a compressive strength generally equivalent to steel.

5. The invention defined in claim 4, wherein the metal wire comprises German silver.

6. The invention defined in claim 4 wherein the metal wire comprises nickeline.

7. The invention defined in claim 4, wherein the metal wire comprises cast bronze.

8. The invention defined in claim 1, wherein said planar section includes at least one other opening for a fastening member for the cylinder head, and the butt joint for the split reinforcing ring is positioned adjacent said other opening.

9. The invention defined in claim 1, wherein the butt joint of the reinforcing ring is angularly shaped in axial cross-section.

10. The invention defined in claim 1, wherein the butt joint of the reinforcing ring is arcuately shaped in axial cross-section.

References Cited

UNITED STATES PATENTS 1,935,552  11/1933  Fitzgerald _____ 277—235(B)

FOREIGN PATENTS 273,560  7/1927  Great Britain ____ 277—235(B)
1,017,416  10/1957  Germany _____ 277—235(B)

ROBERT I. SMITH, Primary Examiner